United States Patent
Oh et al.

(10) Patent No.: US 10,349,235 B2
(45) Date of Patent: Jul. 9, 2019

(54) APPARATUS AND METHOD FOR TRANSMITTING MESSAGE RECEPTION INFORMATION IN WIRELESS COMMUNICATION SYSTEM

(71) Applicant: Samsung Electronics Co., Ltd., Gyeonggi-do (KR)

(72) Inventors: Jaesik Oh, Gyeonggi-do (KR); Jaidong Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 21 days.

(21) Appl. No.: 15/219,896

(22) Filed: Jul. 26, 2016

(65) Prior Publication Data
US 2017/0086042 A1   Mar. 23, 2017

(30) Foreign Application Priority Data
Sep. 18, 2015   (KR) .................. 10-2015-0132127

(51) Int. Cl.
*H04W 4/14* (2009.01)
*H04L 12/58* (2006.01)

(52) U.S. Cl.
CPC .............. *H04W 4/14* (2013.01); *H04L 51/04* (2013.01); *H04L 51/14* (2013.01); *H04L 51/36* (2013.01); *H04L 51/30* (2013.01)

(58) Field of Classification Search
CPC .......... H04W 4/14; H04W 4/18; H04L 51/04; H04L 51/10; H04L 51/30; H04L 51/36; H04L 51/34; H04L 51/38; H04L 51/066; H04L 51/14
See application file for complete search history.

(56) References Cited

U.S. PATENT DOCUMENTS

| | | |
|---|---|---|
| 7,428,580 B2 | 9/2008 | Hullfish et al. |
| 8,230,024 B2 | 7/2012 | Ramanathan et al. |
| 8,571,524 B2 * | 10/2013 | Atarius ............... H04L 51/30 |
| | | 379/100.06 |
| 8,856,245 B2 | 10/2014 | Ferland et al. |
| 2008/0132259 A1 | 6/2008 | Vin |
| 2009/0197622 A1 * | 8/2009 | Atarius ............... H04L 51/30 |
| | | 455/466 |

(Continued)

FOREIGN PATENT DOCUMENTS

| | | | | |
|---|---|---|---|---|
| EP | 2227044 A4 * | 3/2011 | ............. | H04L 51/34 |
| KR | 10-2005-0114155 | 12/2005 | | |

(Continued)

*Primary Examiner* — Matthew C Sams
(74) *Attorney, Agent, or Firm* — The Farrell Law Firm, P.C.

(57) ABSTRACT

An apparatus and method are provided for receiving information related to an instant message (IM) transmitted from another electronic device through a Short Message Service (SMS) network and transmitting information related to message reception through the SMS network. An electronic device includes a reception unit for receiving a first message through a first network, a generation unit for generating a second message including information related to reception of the first message, and a transmission unit for transmitting the second message through the first network. The first message includes information associated with an IM transmitted from the another electronic device through a second network.

19 Claims, 12 Drawing Sheets

(56) References Cited

U.S. PATENT DOCUMENTS

| | | | |
|---|---|---|---|
| 2009/0221310 A1* | 9/2009 | Chen | H04L 51/066 455/466 |
| 2010/0153505 A1* | 6/2010 | Oh | G06Q 10/107 709/206 |
| 2011/0142211 A1 | 6/2011 | Maes | |
| 2012/0030038 A1* | 2/2012 | Russell | G06Q 30/0277 705/14.73 |
| 2012/0149326 A1* | 6/2012 | Zhang | H04W 4/14 455/406 |
| 2014/0025763 A1* | 1/2014 | Furlong | H04L 51/12 709/206 |
| 2015/0149564 A1 | 5/2015 | Kottikulam et al. | |
| 2017/0155612 A1* | 6/2017 | Badulescu | H04L 51/30 |

FOREIGN PATENT DOCUMENTS

| | | | |
|---|---|---|---|
| KR | 10-2007-0074165 | 7/2007 | |
| KR | 10-2010-0024728 | 3/2010 | |
| KR | 10-2010-0115438 | 10/2010 | |
| KR | 10-2012-0072968 | 7/2012 | |
| KR | 10-2013-0073320 | 7/2013 | |
| WO | WO-2009089793 A1 * | 7/2009 | H04L 51/34 |

* cited by examiner

APPARATUS AND METHOD FOR TRANSMITTING MESSAGE RECEPTION INFORMATION IN WIRELESS COMMUNICATION SYSTEM

PRIORITY

This application claims priority under 35 U.S.C. § 119(a) to Korean Patent Application Serial No. 10-2015-0132127, which was filed in the Korean Intellectual Property Office on Sep. 18, 2015, the entire content of which is incorporated herein by reference.

BACKGROUND

1. Field of the Disclosure

The present disclosure relates generally to a technology for generating and transmitting message reception information of a reception end in a wireless communication system.

2. Description of the Related Art

An instant message (IM) service is used in mobile communication terminals to perform chatting and exchange various data among the mobile communication terminals in real-time. Through the IM service, i.e., using an instant messenger, it is possible to use a chatting service, a data transmission service, content information provision service, etc., without the limitation of mobility.

SUMMARY

An aspect of the present disclosure is to provide an apparatus and method for transmitting reception information about a message including IM related information received through a short message service (SMS) network, to an IM transmission side.

Another aspect of the present disclosure is to provide an apparatus and method for transmitting message reception information in a reception side electronic device, when only IM sending information from another electronic device is included in a message received through an SMS network.

Another aspect of the present disclosure is to provide an apparatus and method for transmitting message reception information in a reception side electronic device, when all of the information included in a sent IM is included in a message received through an SMS network.

Another aspect of the present disclosure is to provide an apparatus and method for transmitting message reception information in a reception side electronic device, when a thumbnail of information included in a sent IM is included in a message received through an SMS network.

Another aspect of the present disclosure is to provide an apparatus and method for transmitting message reception information in a reception side electronic device, when information about a failed connection attempt of a voice call and/or video call is included in a message received through an SMS network.

Another aspect of the present disclosure is to provide an apparatus and method for transmitting response writing information of a reception side electronic device about a message received through an SMS network.

In accordance with an aspect of the present disclosure, a method of an electronic device is provided, which includes receiving a first message through a first network, generating a second message including information related to reception of the first message, and transmitting the second message through the first network. The first message includes information related with an IM transmitted from the other electronic device through a second network.

In accordance with another aspect of the present disclosure, an electronic device is provided, which includes a reception unit for receiving a first message through a first network, a generation unit for generating a second message including information related to reception of the first message, and a transmission unit for transmitting the second message through the first network. The first message includes information related with an IM transmitted from the other electronic device through a second network.

In accordance with another aspect of the present disclosure, a system on chip (SoC) of an electronic device in a wireless communication system is provided. The SoC includes a transceiver configured to receive a first message through a first network, wherein the first message includes information associated with an instant message (IM) transmitted from another electronic device through a second network; and a processor configured to generate a second message including information related to reception of the first message. The transceiver is further configured to transmit the second message through the first network.

BRIEF DESCRIPTION OF THE DRAWINGS

The above and other aspects, features, and advantages of certain embodiments of the present disclosure will become more apparent from the following detailed description when taken in conjunction with the accompanying drawings in which.

DETAILED DESCRIPTION

Various embodiments of the present disclosure will be described herein below with reference to the accompanying drawings. In describing the present disclosure below, well-known functions or constructions are not described in detail in order to avoid obscuring the disclosure in unnecessary detail. Further, terms used in the description below, which are defined considering functions in the present disclosure, may be modified in accordance to user and/or operator intention or practice. Therefore, the definitions should be based on the content throughout the present specification.

For example, terms such as ' . . . unit', and terms ending in ' . . . er', etc., used below may represent the unit of processing at least one function or operation, and this may be implemented by hardware, software, or a combination of hardware and software.

The present disclosure describes a technology for transmitting and receiving a message between electronic devices supporting an IM service in a communication system. More particularly, the present disclosure relates to a technology for, if an instant message reception side electronic device is unavailable for packet data communication (e.g., overseas roaming, data service stopping, etc.), transmitting reception or non-reception of an IM, checking or non-checking of a received message, and information of a written state of a response to a received message, to an IM transmission side electronic device.

Commonly, an IM service is performed through a packet data communication network. However, the IM service cannot be performed when packet data communication is unavailable (e.g., data use stopping, overseas roaming, etc.).

Although an electronic device is located in an area in which packet data communication is unavailable, receiving a message and forwarding feedback about the received message to a sending subject may still be performed. For example, if a communication device capable of servicing packet data communication and circuit data communication enters a state in which the packet data communication is unavailable, the communication device can send and feedback an IM by the circuit data communication through an interworking function (IWF).

Figure 1:
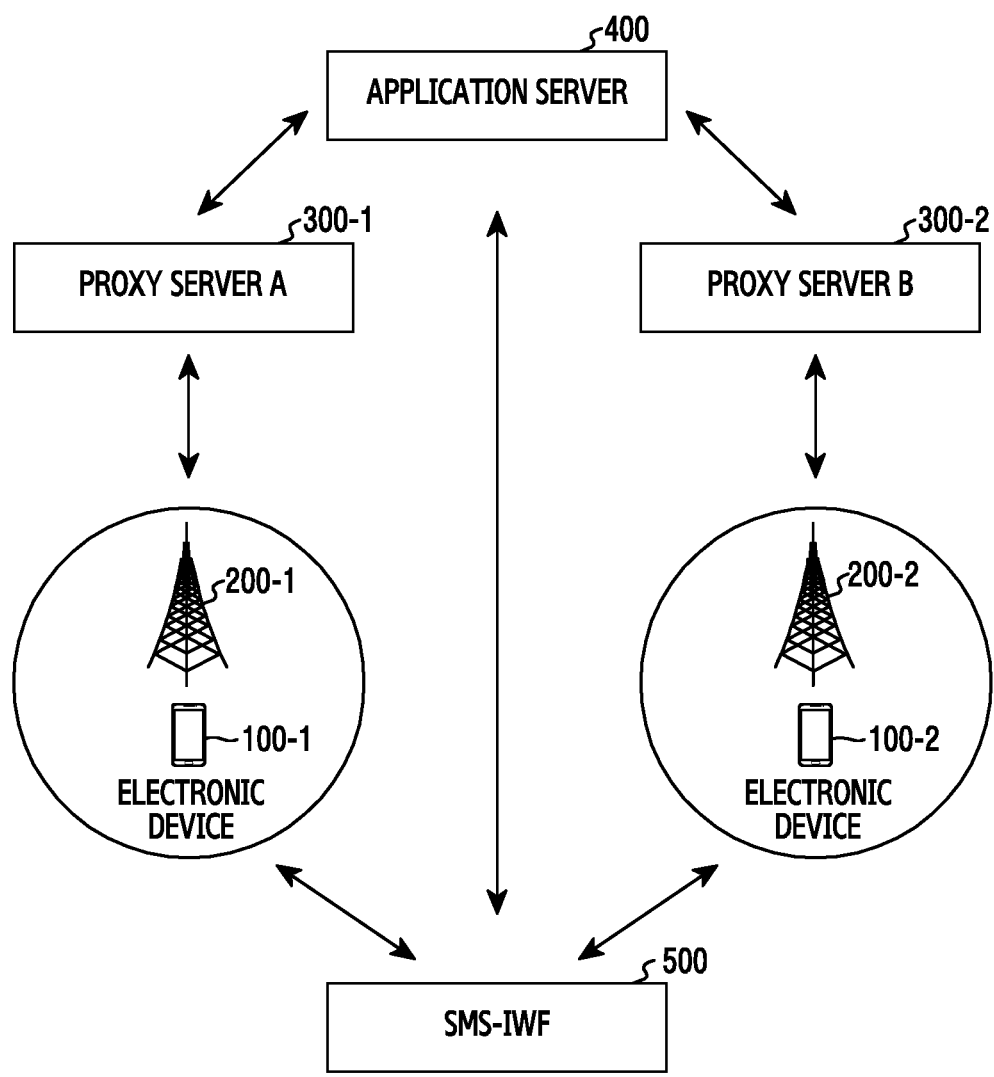
FIG. 1 illustrates a communication system for transmitting/receiving an IM according to an embodiment of the present disclosure.

FIG. 1 illustrates a communication system for transmitting/receiving an IM according to an embodiment of the present disclosure.

Herein, an IM service includes, but is not limited to, a chatting service for performing chatting among a plurality of users by a text, a voice, etc., a data transmission service for exchanging various kinds of data such as a still picture, a moving picture, a sound, etc., with a counterpart user, and an information provision service for providing various information such as news, a weather, a sound, etc. The electronic device supports the IM service. A user of the electronic device may make use of the chatting service, the data transmission service, the contents information provision service, etc., without the limitation of mobility, using the IM service.

Referring to FIG. 1, an electronic device 100-1 and an electronic device 100-2 are provided with an IM service. For example, the electronic device 100-1 and the electronic device 100-2 may each have an application for the IM service.

In FIG. 1, it is assumed that the electronic device 100-1 transmits an IM to the electronic device 100-2. The IM transmitted by the electronic device 100-1 is received by an application server 400, via a base station 200-1 and a proxy server A 300-1. The base station 200-1 controls the coverage in which the electronic device 100-1 is located, and the proxy server A 300-1 provides the IM service to the electronic device 100-1.

When the electronic device 100-2 is available for packet data communication, the application server 400 transmits the received IM to the electronic device 100-2, via a proxy server B 300-2 and a base station 200-2. The base station 200-2 controls the coverage in which the electronic device 100-2 is located, and the proxy server B 300-2 provides the IM service to the electronic device 100-2.

The electronic device 100-2 receiving the IM may transmit an IMDN message through the same path as a path receiving the IM; however, in the opposite direction. The IMDN message may include information about IM transmission/reception. For example, the IMDN message may include information about whether the electronic device 100-2 has received the IM and whether the electronic device 100-2 has checked the IM. Further, the IMDN message may include information about whether the electronic device 100-2 receives the IM and is writing a response thereto.

Alternatively, when the electronic device 100-1 and the electronic device 100-2 are located in a close place, e.g., in the same coverage area, the electronic device 100-1 and the electronic device 100-2 may communicate through the same base station and/or the same proxy server.

In FIG. 1, it is assumed that the electronic device 100-2 fails to receive the IM due to a specific situation (e.g., overseas roaming, data service stopping, etc.). In this case, the IM transmitted from the electronic device 100-1 may be transmitted to the electronic device 100-2 through an SMS network. That is, when the application server 400 recognizes that the electronic device 100-2 is not able to receive the IM due to packet data communication be unavailable, etc., a messaging service-interworking function (MS-IWF) server 500 may transform the IM into a corresponding message and transmit the transformed message to the electronic device 100-2. Here, the MS-IWF server 500 may be a short message service-interworking Function (SMS-IWF) server or a multimedia messaging service (MMS) server. The IM may be transformed into an SMS form or MMS form through interworking of the SMS-IWF server 500.

The electronic device 100-2 may receive information associated with an IM transmitted by the electronic device 100-1, through the SMS network. For example, a message received through the SMS network may include information notifying that the IM has been transmitted to the electronic device 100-2 and/or may include all of the information of the IM.

For example, when the IM includes a character, the message received through the SMS network may include a character corresponding to the character included in the IM. Alternatively, when the IM includes image information such as a photo, etc., the message received through the SMS network may include the same image information.

When the IM includes sound information, the message received through the SMS message may include the sound information, or when the IM includes video information, the message received through the SMS network may include the video information.

When an amount of data such as sound, image, video information, etc., included in the IM is relatively big, the message received through the SMS network may include thumbnail information representing the sound, image, video information, etc., included in the IM.

In accordance with another embodiment of the present disclosure, when a reception side electronic device attempts a voice call or video call connection through the IM service, but fails in the connection, due to packet data communication being unavailable, etc., the message received through the SMS network may include information notifying the reception side electronic device that the failed video call or voice call connection attempt occurred.

The electronic device 100-2 receiving a message through the SMS network may transmit an IMDN message. The IMDN message may include information about IM service related, IM transmission/reception. Here, because the IM service is in a temporarily unavailable state, the electronic device 100-2 may transmit the IMDN message through the SMS network.

Referring to FIG. 1, the IMDN message may be transmitted to the SMS-IWF server 500 through the SMS network. The IMDN message transmitted through the SMS network may include information related to message reception of the electronic device 100-2. For example, when the electronic device 100-2 receives a message including information that the electronic device 100-1 has transmitted an IM, the IMDN message may include information that the electronic device 100-2 has recognized transmission/non-transmission of the IM.

Further, it may be assumed that all of the information included in the IM is included in a message received by the electronic device 100-2. That is, the message received through the SMS network includes all of the information included in the IM, such as a character, a sound, an image, and a video, etc.

The IMDN message may also include information that the electronic device 100-2 has received the information such as the character, image, sound, etc. through the message received through the SMS network.

The IMDN message may include information about whether the electronic device 100-2 is writing a response to a message received through the SMS network, and/or information that the electronic device 100-2 has recognized a failure of connection of a voice call or video call through the message received through the SMS network.

The IMDN message is transmitted to the SMS-IWF server 500 through the SMS network, and may be forwarded to the electronic device 100-1 through interworking of the application server 400 and the SMS-IWF server 500. The electronic device 100-1 may recognize information about the message reception of the electronic device 100-2 through the received IMDN message.

Figure 2:
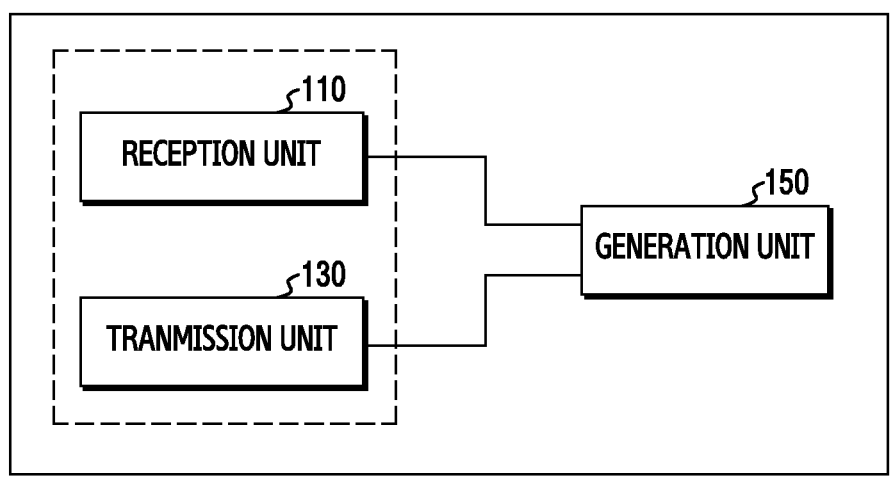
FIG. 2 illustrates an electronic device according to an embodiment of the present disclosure.

FIG. 2 illustrates an electronic device according to an embodiment of the present disclosure.

Referring to FIG. 2, the electronic device includes a reception unit 110 for receiving a message including information, a transmission unit 130 for transmitting a message including information, and a generation unit 150, e.g., a hardware processor, for generating an IMDN message. The reception unit 110 and the transmission unit 130 may be configured as one transmission/reception unit, e.g., as one transceiver.

The reception unit 110 may receive a message through an SMS network. The message received through the SMS network may include information associated with an IM transmitted from the other electronic device, e.g., information about transmission of the IM from the other electronic device. The message received through the SMS network may also include information about an image, a sound, a video, etc., included in the IM. The message received through the SMS network may also include thumbnails for the image, sound, video, etc., included in the IM. The message received through the SMS network may include information about a connection attempt or connection failure of a video call or voice call, etc., from the other electronic device.

The transmission unit 130 may transmit an IMDN message generated in the generation unit 150. For example, when the electronic device is temporarily unavailable for an IM service, the IMDN message may be transmitted through the SMS network.

The generation unit 150 may generate an IMDN message. For example, when the electronic device is temporarily (or continuously) unavailable for the IM service, the IMDN message may be generated in an SMS form in order to be transmitted through the SMS network. When the message received through the SMS network includes information that the IM has been transmitted from the other electronic device, the IMDN message may include information that the electronic device 100 has recognized that the IM has been transmitted from the other electronic device.

When the message received through the SMS network includes all of the information about a sound, an image, and a video, etc., included in the IM, the IMDN message may include information that the electronic device has received the information about the sound, image, and video, etc., through the received message.

When the message received through the SMS network includes a thumbnail of the information about the sound, image, and video, etc., included in the IM, the IMDN message may include information that the electronic device 100 has received the thumbnail of the information about the sound, image, and video, etc.

The IMDN message may include information that the electronic device has received information about an attempt and/or failure of a video call or voice call connection.

An IMDN message generated in the generation unit 150 may be forwarded to the transmission unit 130, which transmits the IMDN message through the SMS network.

In the following description, although it is assumed that the IM is sent through a packet data communication network, and an SMS is sent through a circuit data communication network, an electronic device may perform voice and packet data communication using other communication networks. For example, a circuit switched fallback (CSFB) scheme may perform circuit data communication for voice and message services (e.g., SMS and multimedia messaging service (MMS)) through a 2-generation/3-generation (2G/3G) communication network, and provide a packet data communication service for the IM through a 4G communication network (e.g., using long term evolution (LTE)). The CSFB scheme may use LTE for packet data communication and an existing network (e.g., WCDMA network) for a voice call, to provide a voice call service. When the electronic device performs SMS communication in a packet data communication network (e.g., an LTE communication network) handover state, the electronic device may perform a handover to the 2G/3G network, to perform the SMS communication.

If an electronic device is in a state in which packet data communication is unavailable (e.g., if the electronic device enters a packet data communication unavailable area, if a packet data communication function turns off (e.g., data network connection off, WiFi off, etc.), and if a data use amount is exceeded, etc.), the electronic device may notify this state to a server. At this time, the packet data communication function may be turned off but the circuit data communication (for example, 3G network) is still operable.

When the electronic device is in a state in which packet data communication is unavailable, and another electronic device (hereinafter, "transmitting electronic device") sends an IM, the transmitting electronic device may send a SIP INVITE message to the server through the packet data communication network, and the server may send the SIP INVITE message to an SMS-IWF server. The SMS-IWF server may notify the server that the packet data communication is unavailable, such that the server may send an acknowledgement (Ack) message to the SMS-IWF server, and send a SIP OK message to a user.

A message transmitted from the transmitting electronic device may be sent to the server through the packet data communication network, and the server may send the IM to the SMS-IWF server. The SMS-IWF server may transform the IM into an SMS message, and send the transformed SMS message to the electronic device through a circuit data communication network. The sent information may include information related to the message and the transformed IM. That is, the electronic device may receive the IM in an SMS message form through the circuit data communication network, and the electronic device receiving the transformed SMS message may send another response message (i.e., a message sent ok) to the SMS-IWF server through the circuit data communication network. The SMS-IWF server may transform the SMS message into an IM form and send the transformed message to the counterpart electronic device side. Here, the circuit data communication network may include an SMS network.

As described above, an electronic device unavailable for packet data communication may still communicate an IM with another electronic device through a circuit data communication network.

Alternatively, the reception unit 110, the transmission unit 130, and the generation unit 150 may be embodied as a system on chip (SoC), e.g., an integrated circuit (IC).

Figure 3:
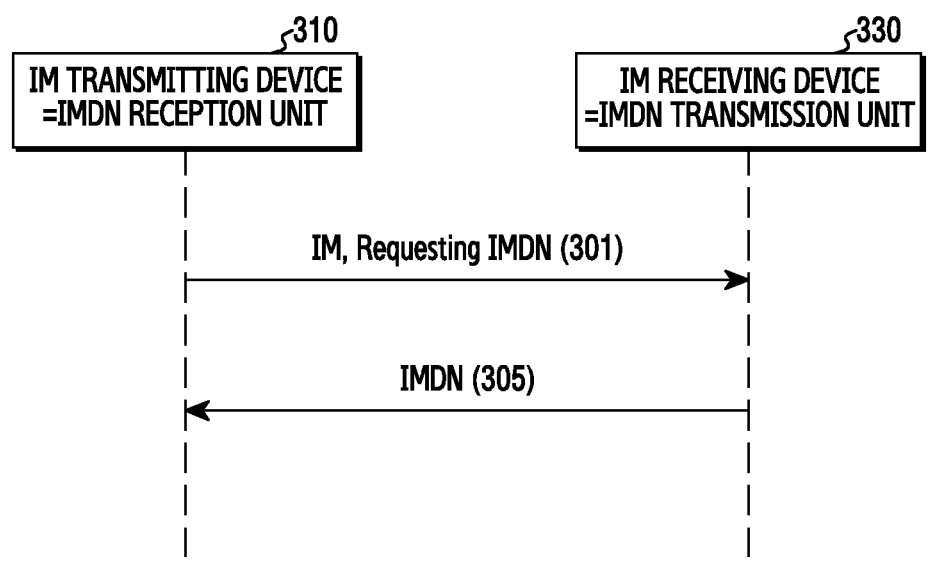
FIG. 3 is a signal flow diagram illustrating a method of transmitting/receiving an IM and an instant message disposition notification (IMDN) message according to an embodiment of the present disclosure.

FIG. 3 illustrates a method of transmitting/receiving an IM and an IMDN message according to an embodiment of the present disclosure.

Referring to FIG. 3, an IM transmitting device 310 generates an IM, and attaches IMDN request information to the IM. The IMDN request information is used to request information about an IM receiving device 330. Generally, the IM transmitting device 310 is also an IMDN reception unit.

In step 301, the IM transmitting device 310 transmits the generated IM and the attached IMDN request information, to the IM receiving device 330. When the IM receiving device 330 is temporarily or non-temporarily unavailable for an IM service (e.g., is unavailable for packet data communication), the IM and the IMDN request information may be transmitted to the IM receiving device 330 through an SMS network. The IM receiving device 330 may receive the IM including IMDN request information. The IM receiving device 330 may also be referred to as an IMDN transmission unit.

The IM receiving device 330 may automatically generate a notification message for the IM transmitting device 310. The notification message may be referred to as an IMDN message.

In response to the IMDN request information, the IM receiving device 330 may generate an IMDN message. When the IM receiving device 330 is temporarily or non-temporarily unavailable for the IM service (e.g., is unavailable for the packet data communication, etc.), the IMDN message may be generated to be transmitted through the SMS network.

When a message received through the SMS network includes information that the IM has been transmitted from the other electronic device, the IMDN message may include information that the IM receiving device 330 has recognized that the IM is transmitted from the other electronic device.

When the message received through the SMS network includes all of the information about a sound, an image, and a video, etc., included in the IM, the IMDN message may include information that the IM receiving device 330 has received the information about the sound, image, and video, etc., through the SMS message.

The IMDN message may also include information about whether IM receiving device 330 is writing a response to the message received through the SMS network. The IMDN message may include information that the IM receiving device 330 has received information about an attempted and/or failed video call or voice call connection.

In step 305, the IM receiving device 330 transmits the generated IMDN message through the SMS network.

Figure 4:
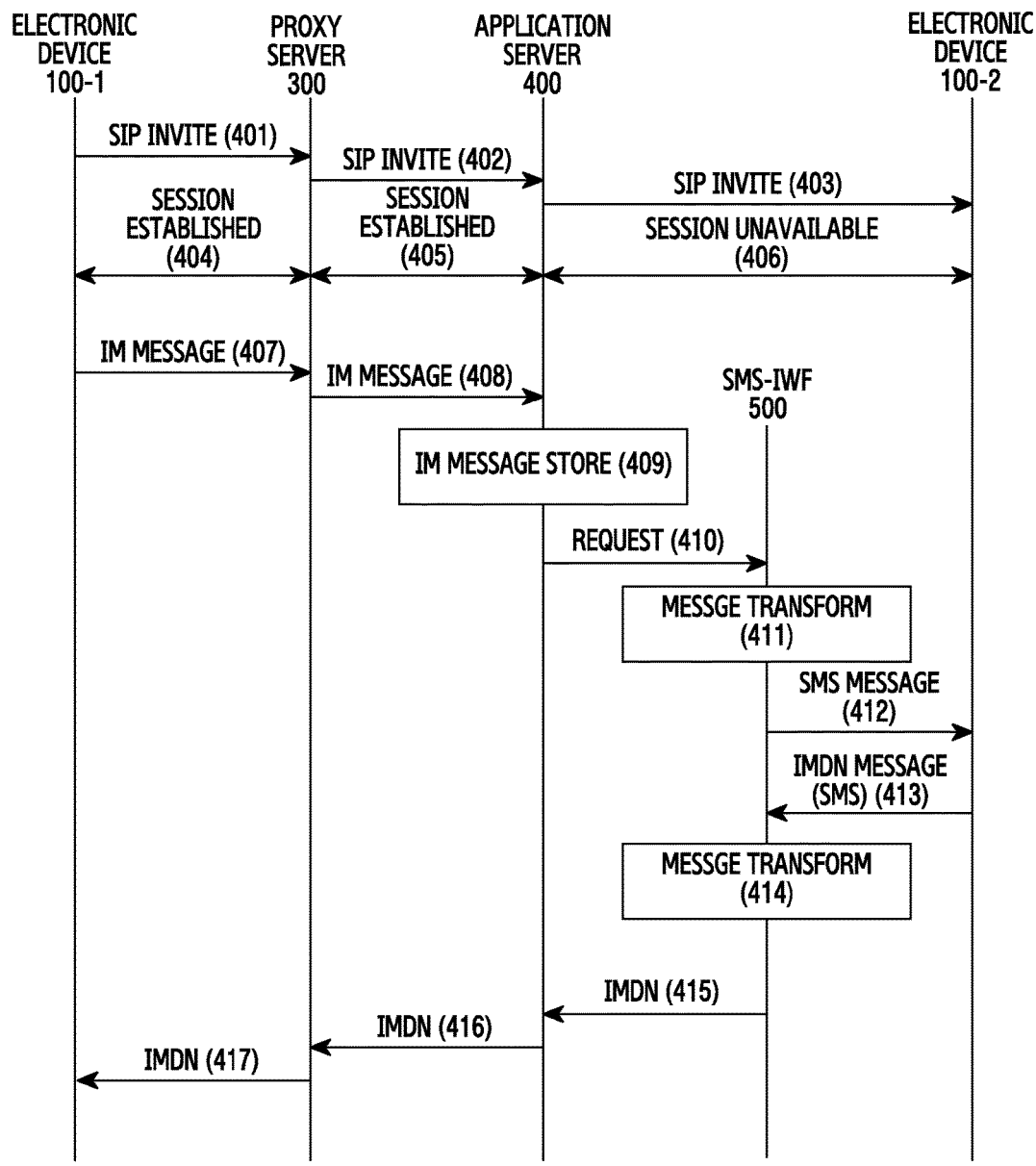
FIG. 4 is a signal flow diagram illustrating a method for transmitting message reception related information in an electronic device that receives a message including IM related information through an SMS network according to an embodiment of the present disclosure.

FIG. 4 is a signal flow diagram illustrating a method for transmitting message reception related information in an electronic device that receives a message including IM related information through an SMS network according to an embodiment of the present disclosure. For example, the method illustrated in FIG. 4 will be described with reference to a communication system as illustrated in FIG. 1.

An internet protocol (IP) multimedia subsystem (IMS) refers to the standard for providing a multimedia service such as a voice, an audio, a video, and data, etc., based on an IP. The IMS basically uses a generic Internet-based technology and standardized network functions, thereby seeking the improvement of a price competitiveness of service and the prompt development and change of service.

Also, the IMS is independent from an access network, and applications of different networks are easy to interwork with one another due to the improvement of a session management function, to promote global interworking between services and the conversion of wired/wireless networks. The IMS is currently evolving into a technology supporting various wired/wireless integrated networks based on an IP network as well as a mobile communication system.

The IMS uses a session initiation protocol SIP for all multimedia service control procedures. The SIP of an application layer specifies a procedure for identifying and locating intelligence terminals intending to communicate on the Internet, and generating, deleting, or changing a multimedia communication session between the terminals.

The IMS, which is a request/response structure of controlling the generation, modification, and ending of a multimedia service session of Internet-based conference, telephone, voice mail, event notification, instant messaging, etc., may be used in a transmission control protocol (TCP) and a user datagram protocol (UDP). The IMS uses a SIP uniform resource locater (URL) similar with an e-mail address in order to distinguish respective users, thereby being provided with a service without being subordinated to an IP address.

SIP, which is a text-based application layer control protocol for setting, modifying, and ending a session or call for multimedia communication of an image, a voice, etc., may be used for remote conference, telephone, event notification, etc., and may be used for instant messaging, particularly, in relation with the present disclosure.

SIP may include a request (i.e., a SIP request) message and a response (i.e., a SIP response) message. The request message may include an SIP INVITE (i.e., session participation invite) message.

Referring to FIG. 4, in step 401, an electronic device 100-1 transmits a SIP INVITE message to a proxy server 300, for a session connection in order to transmit an IM.

In step 402, for the session connection, the proxy server 300 transmits the SIP INVITE message to an application server 400 managing an IM service. In steps 404 and 405, the session connection is established between the electronic device 100-1 and the proxy server 300, and the proxy server 300 and the application server 400.

In step 403, to determine whether it is possible to transmit an IM sent from the electronic device 100-1, to an electronic device 100-2 using packet data communication, the application server 400 transmits the SIP INVITE message to the electronic device 100-2. Because the present disclosure premises that the electronic device 100-2 is unavailable for an IM service (e.g., is unavailable for the packet data communication), FIG. 4 assumes that the session connection is unavailable between the application server 400 and the electronic device 100-2 in step 406.

In step 407, the electronic device 100-1 generates an IM, and transmits the IM message to the proxy server 300. The IM may include IMDN request information.

In step 408, the proxy server 300 transmits the IM received from the electronic device 100-1, to the application server 400.

The application server 400 stores the received IM in step 409.

In step 410, the application server 400 requests an SMS-IWF server 500 to transform the IM into an SMS (or MMS) message and transmit the SMS message to the electronic device 100-2 through an SMS network (or a circuit data communication network).

In step 411, the SMS-IWF server 500 transforms the IM into the SMS (or MMS) message through an SMS interworking function (SMS-IWF).

In step 412, the SMS-IWF server 500 transmits the SMS message, which is a transformed form of the IM transmitted by the electronic device 100-1, to the electronic device 100-2 that is unavailable for the IM service. The electronic device 100-2 receiving the SMS message may generate an IMDN message in order to forward information about message reception or non-reception to the electronic device 100-1, in accordance with the IMDN request information included in the IM. The IMDN message may include information about whether the electronic device 100-2 has received (and in which form) the IM sent from the electronic device 100-1.

When a message received through the SMS network includes information that the IM has been transmitted from the electronic device 100-1, the IMDN message may include information that the electronic device 100-2 has recognized that the IM has been transmitted from the electronic device 100-1.

When the message received through the SMS network includes all of information about a sound, an image, and a video, etc., included in the IM, the IMDN message may include information that the electronic device 100-2 has received the information about the sound, image, and video, etc., through the SMS message.

When the message received through the SMS network includes a thumbnail of the information about the sound, image, and video, etc., included in the IM, the IMDN message may include information that the electronic device 100-2 has received the thumbnail of the information about the sound, image, and video, etc.

The IMDN message may include information about whether the electronic device 100/2 is writing a response to the message received through the SMS network. The IMDN message may also include information that the electronic device 100-2 has received information about a failed video call or voice call attempt.

In step 413, the electronic device 100-2 transmits the IMDN message to the SMS-IWF server 500 through the SMS network.

In step 414, the SMS-IWF server 500 transforms the IMDN message received through the SMS network using an SMS interworking function, in order to transmit the transformed IMDN message to the application server 400 through the packet data communication network.

In step 415, the SMS-IWF server 500 transmits the IMDN message, which is transformed to be suitable for packet data communication, to the application server 400.

In steps 416 and 417, the IMDN message is transmitted to the electronic device 100-1, via the proxy server 300, through preset session connection. Accordingly, the electronic device 100-1 receives information about whether and in which form the electronic device 100-2 has received the IM transmitted by the electronic device 100-1.

Figure 5:
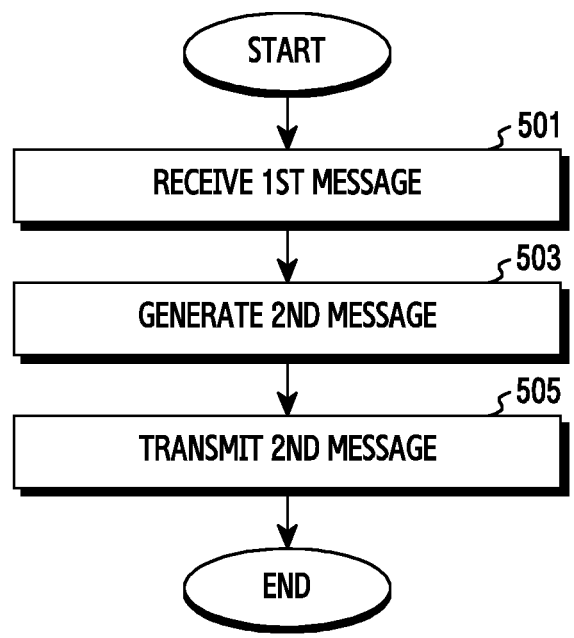
FIG. 5 is a flowchart illustrating a method of an electronic device for transmitting message reception related information according to an embodiment of the present disclosure.

FIG. 5 is a flowchart illustrating a method of an electronic device for transmitting message reception related information according to an embodiment of the present disclosure.

Referring to FIG. 5, in step 501, the electronic device receives a first message. The first message may include a message including IMDN request information.

When the electronic device is temporarily or non-temporarily unavailable for an IM service due to packet data communication unavailability, etc., the electronic device may receive the first message through an SMS network. Here, the first message may include information related to an IM transmitted from the other electronic device. For example, the first message may include information notifying that the IM has been transmitted for the electronic device 100 from another electronic device. For example, the first message may include an image, video, character information, etc., included in the IM transmitted from the other electronic device, or thumbnails of the image, video information, etc., included in the IM. The first message may also include information about a failed voice call or video call attempt from the other electronic device.

In step 503, the electronic device generates a second message, i.e., an IMDN message, based on the IMDN request information included in the first message. The second message (or IMDN message) may include information related to the first message reception of the electronic device.

When the first message received through the SMS network (or circuit data communication network) includes information that the IM has been transmitted from the other electronic device, the second message may include information that the electronic device has recognized that the IM has been transmitted from the other electronic device.

When the first message received through the SMS network includes all of the information about a sound, an image, and a video, etc., included in the IM, the second message may include information that the electronic device 100 has received the information about the sound, image, and video, etc., through the first message.

When the first message received through the SMS network includes thumbnails of the information about the sound, image, and video, etc., included in the IM, the second message may include information that the electronic device has received the thumbnails of the information about the sound, image, and video, etc., through the first message.

The second message may also include information about whether it the electronic device is writing a response to the first message received through the SMS network, and/or information about a failed video call or voice call attempt.

In step 505, the electronic device transmits the generated second message (or IMDN message). When the electronic device unavailable for the IM service (e.g., is unavailable for the packet data communication, etc.), the second message may be transmitted through the SMS network.

FIG. 6 to FIG. 11 are flowcharts illustrating methods of receiving information associated with an IM transmitted from another electronic device and transmitting an IMDN message, through an SMS network, according to an embodiment of the present disclosure.

Figure 6:
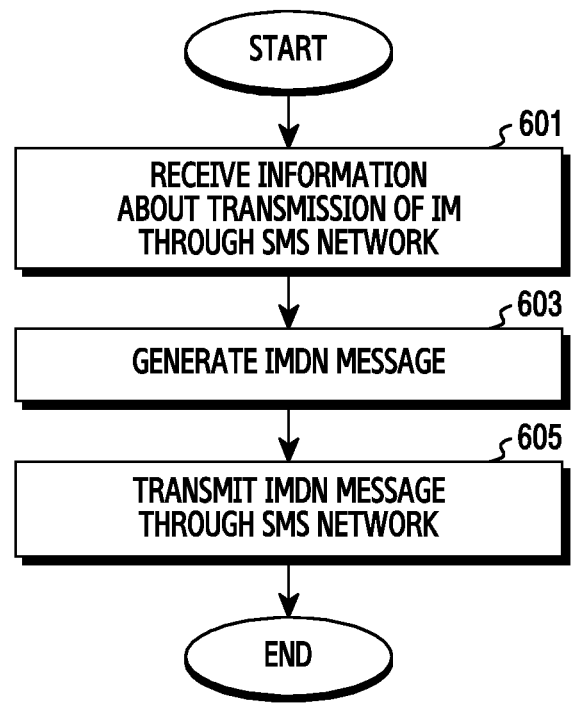
FIG. 6 to FIG. 11 are flowcharts illustrating methods of receiving information associated with an IM transmitted from another electronic device and transmitting an IMDN message, through an SMS network, according to embodiments of the present disclosure.

Referring to FIG. 6, in step 601, the electronic device receives information about transmission of an IM through an SMS network, e.g., in a first message. The first message may include information related with the IM transmitted from the other electronic device, wherein the electronic device fails to be provided with an IM service. The first message may include IMDN request information.

In step 603, the electronic device receiving the information about the transmission of the IM through the first message generates an IMDN message based on the IMDN request information included in the first message. The IMDN message may include information that the electronic device has recognized that the IM has been transmitted from the other electronic device through the IMDN request information included in the first message.

In step 605, the electronic device transmits the generated IMDN message to the other electronic device. For example, the transmission of the IMDN message may be achieved through the SMS network because of the packet data communication unavailability, etc., of the electronic device. Also, the IMDN message may be transformed in the SMS-IWF server for transmission to the other electronic device through a packet data communication network in the transmission process.

Figure 7:
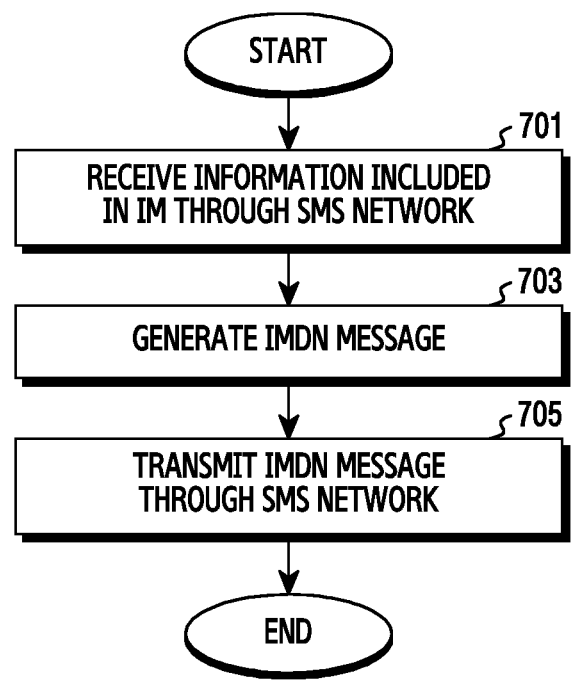

Referring to FIG. 7, in step 701, the electronic device receives a first message including information included in an IM transmitted from the other electronic device through an SMS network. The information included in the IM may include at least one of image, video and sound information. The first message may include information related with the IM transmitted from the other electronic device, when the electronic device fails to be provided with an IM service. The first message may include IMDN request information.

In step 703, the electronic device receiving the information included in the IM through the first message may generate an IMDN message based on the IMDN request information included in the first message. The IMDN message may include information that the electronic device has received information of an image, a sound, a video, etc., included in the IM from the other electronic device through the IMDN request information included in the first message.

In step 705, the electronic device transmits the generated IMDN message to the other electronic device. Here, the transmission of the IMDN message may be achieved through the SMS network because of packet data communication unavailability, etc., of the electronic device. Also, the IMDN message may be transformed in the SMS-IWF server for transmission to the other electronic device through a packet data communication network in the transmission process.

Figure 8:
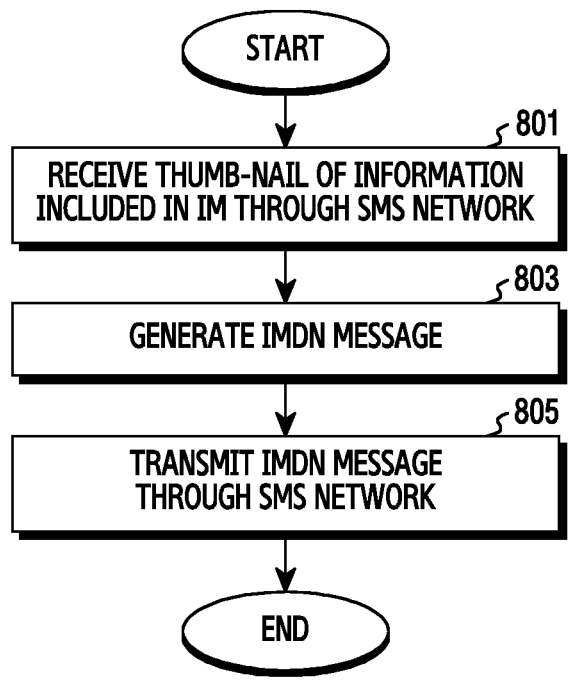

Referring to FIG. 8, in step 801, the electronic device receives a first message including a thumbnail of information included in an IM transmitted from the other electronic device through an SMS network. The information included in the IM may include at least one of image, video and sound information. The first message may include information related with the IM transmitted from the other electronic device, when the electronic device fails to be provided with an IM service. The first message may include IMDN request information.

In step 803, the electronic device 100 receiving the information included in the IM through the first message generates an IMDN message based on the IMDN request information included in the first message. The IMDN message may include information indicating that the electronic device has received information of an image, a sound, a video, etc., included in the IM from the other electronic device through the IMDN request information included in the first message.

In step 805, the electronic device transmits the generated IMDN message to the other electronic device. Here, the transmission of the IMDN message may be achieved through the SMS network because of packet data communication unavailability, etc., of the electronic device. Also, the IMDN message may be transformed in the SMS-IWF server for transmission to the other electronic device through a packet data communication network in the transmission process.

Figure 9:
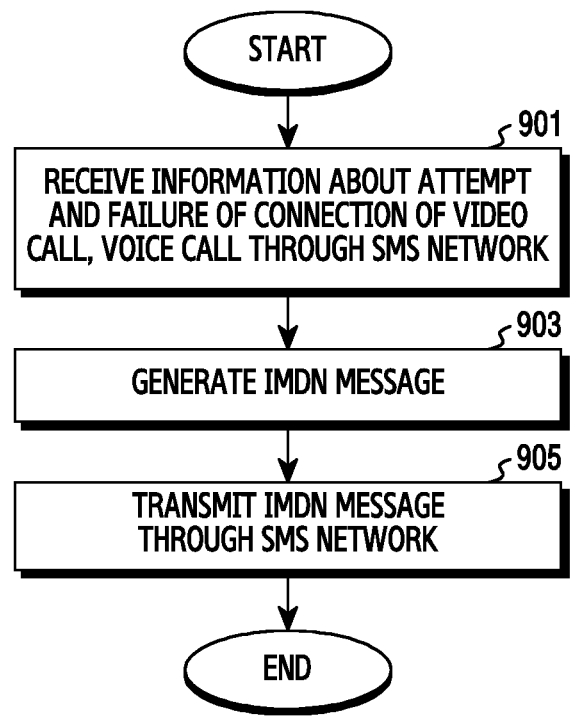

Referring to FIG. 9, in step 901, the electronic device receives a first message including information about a failed video or voice call, etc., from the other electronic device, through an SMS network. The first message may also include IMDN request information.

In step 903, the electronic device receiving the information about the failed call attempt, etc., from the other electronic device, through the first message, generates an IMDN message based on the IMDN request information included in the first message. The IMDN message may include information indicating that the electronic device has recognized the failed call attempt, etc., from the other electronic device through the reception of the first message.

In step 905, the electronic device transmits the generated IMDN message to the other electronic device. Here, the transmission of the IMDN message may be achieved through the SMS network because of packet data communication unavailability, etc., of the electronic device. Also, the IMDN message may be transformed in the SMS-IWF server for transmission to the other electronic device through a packet data communication network in the transmission process.

Figure 10:
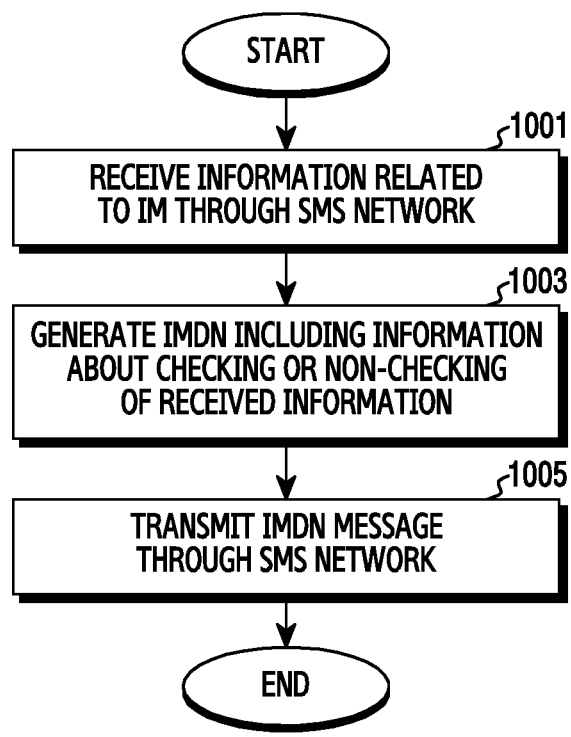

Referring to FIG. 10, in step 1001, the electronic device receives a first message including information associated with an IM transmitted from the other electronic device through an SMS network, because the electronic device fails to be provided with an IM service. The first message may include IMDN request information.

In step 1003, the electronic device receiving the information associated with the IM through the first message generates an IMDN message based on the IMDN request information included in the first message. The IMDN message may include information about whether the electronic device has checked the information associated with the IM through the information included in the received first message.

In step 1005, the electronic device transmits the generated IMDN message to the other electronic device. Here, the transmission of the IMDN message may be achieved through the SMS network because of packet data communication unavailability, etc., of the electronic device. Also, the IMDN message may be transformed in the SMS-IWF server for transmission to the other electronic device through a packet data communication network in the transmission process.

Figure 11:
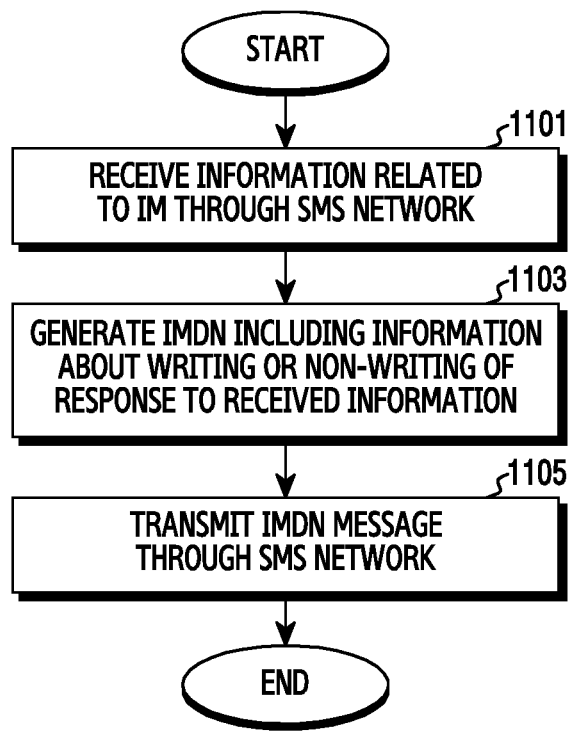

Referring to FIG. 11, in step 1101, the electronic device receives a first message including information associated with an IM transmitted from the other electronic device through an SMS network, when the electronic device fails to be provided with an IM service. The first message may include IMDN request information.

In step 1103, the electronic device receiving the information associated with the IM through the first message generates an IMDN message based on the IMDN request information included in the first message. The IMDN message may include information about whether the electronic device writes a response to the received first message.

In step 1105, the electronic device transmits the generated IMDN message to the other electronic device. Here, the transmission of the IMDN message may be achieved through the SMS network because of packet data communication unavailability, etc., of the electronic device. Also, the IMDN message may be transformed in the SMS-IWF server for transmission to the other electronic device through a packet data communication network in the transmission process.

Figure 12:
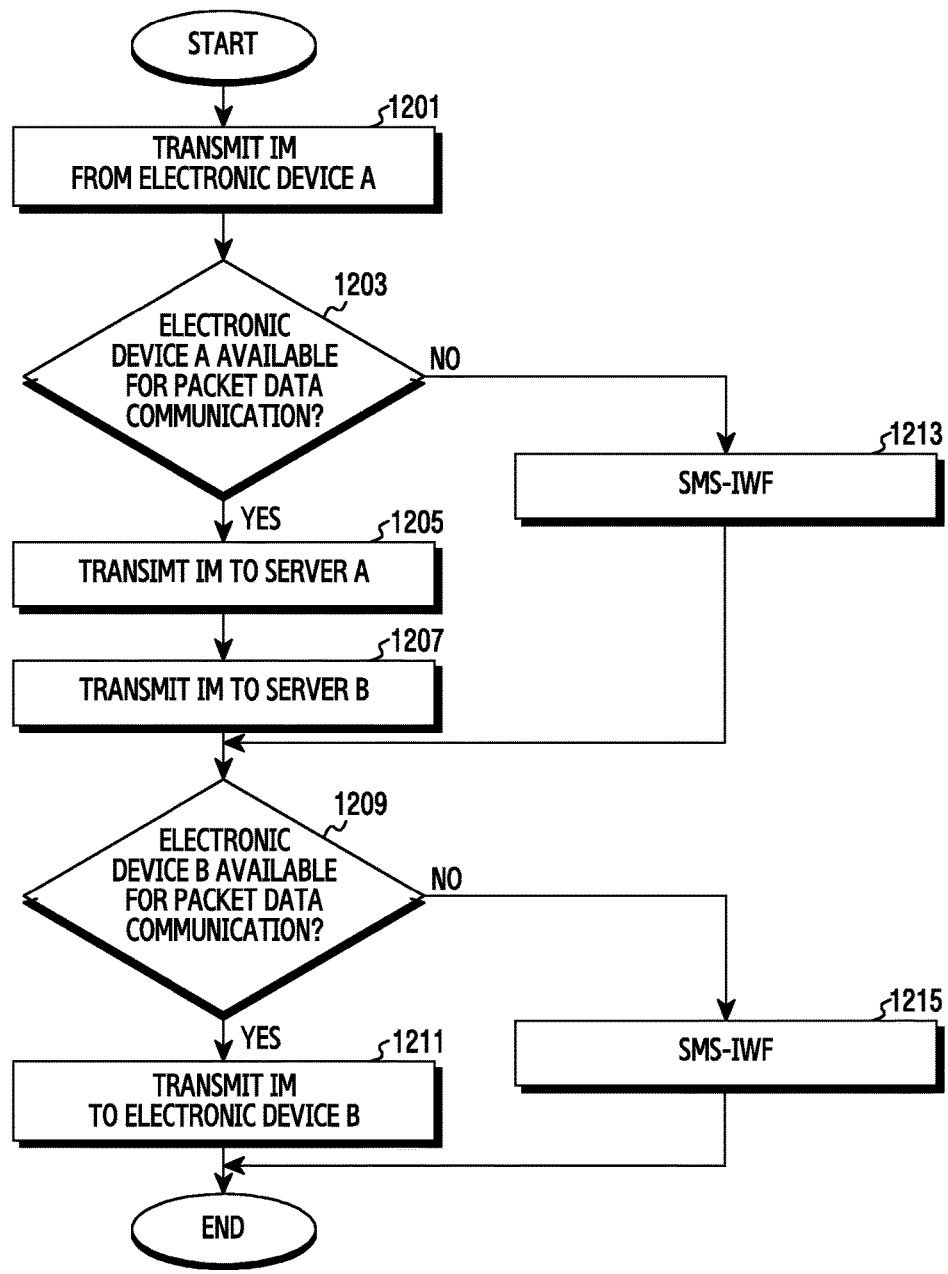
FIG. 12 is a flowchart illustrating a method of transmitting IM related information through an SMS network according to an embodiment of the present disclosure.

FIG. 12 is a flowchart illustrating a method of transmitting IM related information through an SMS network according to an embodiment of the present disclosure.

Referring to FIG. 12, in step 1201, an IM is transmitted from an electronic device A.

In step 1203, because the IM is generally transmitted/received through a packet data communication network, it is determined, e.g., by an application server, if the electronic device A is available for packet data communication.

If the electronic device A is available for the packet data communication, the IM may is transmitted to a server A and a server B in steps 1205 and 1207. Alternatively, the server A and the server B may be embodied as one server.

However, if the electronic device A is unavailable for the packet data communication in step 1203, the IM that the electronic device A intends to transmit is transmitted to the server B through an SMS-IWF in step 1213.

In step 1209, in order to transmit the IM to an electronic device B, it is determined if the electronic device B is available for the packet data communication.

If the electronic device B is available for the packet data communication, the IM is transmitted to the electronic device B through the packet data communication network in step 1211.

However, if it is determined that the electronic device B is unavailable for the packet data communication in step 1209, the IM is transmitted to the electronic device B through the SMS network by means of the SMS-IWF in step 1215. Here, the message transmitted to the electronic device B through the SMS network may include information associated with the IM transmitted from the electronic device A.

The above described embodiments of the present disclosure may receive a message including information related to an IM transmitted from the other electronic device through an SMS network, and transmit information related to the message reception through the SMS network. Accordingly, an IM transmission side electronic device may check IM reception related information of a counterpart electronic device, and an electronic device may service an IM and an SMS/MMS message interworking with each other in accordance with user's selection. For example, if a data use amount of the electronic device exceeds a data size threshold, the electronic device may be notified to use PS/WIFI data, and may provide a service of real-time interworking with all electronic devices available for packet data communication.

The above-described methods according to different embodiments of the present disclosure may be implemented in a form of hardware, software, or a combination of hardware and software.

According to various embodiments, a system on chip (SoC) of an electronic device in a wireless communication system comprises a transceiver and a processor. The transceiver is configured to receive a first message through a first network. The first message includes information associated with an instant message (IM) transmitted from another electronic device through a second network. The processor is configured to generate a second message including information related to reception of the first message. And, the transceiver is further configured to transmit the second message through the first network.

If the methods are implemented by the software, a computer-readable storage medium storing one or more programs (i.e., software modules) may be provided. The one or more programs stored in the computer-readable storage medium are configured to be executable by one or more processors within an electronic device. The one or more programs may include instructions for enabling the electronic device to execute the methods according to embodiments stated in the claims and/or specification of the present disclosure.

These programs (i.e., software modules or software) may be stored in a Random Access Memory (RAM), a non-volatile memory including a flash memory, a Read Only Memory (ROM), an Electrically Erasable Programmable ROM (EEPROM), a magnetic disk storage device, a Compact Disc ROM (CD-ROM), a Digital Versatile Disc (DVD) or an optical storage device of other form, and a magnetic cassette. The programs may also be stored in a memory constructed by a combination of some or all of them. Also, each constructed memory may be included in plural as well.

Also, the programs may be stored in an attachable storage device accessible to the electronic device through a communication network such as the Internet, an intranet, a Local Area Network (LAN), a Wireless LAN (WLAN) and a Storage Area Network (SAN), or a communication network constructed by a combination of them. This storage device may access a device performing embodiments of the present disclosure through an external port. Also, a separate storage device on the communication network may access the device performing embodiments of the present disclosure as well.

In the aforementioned embodiments of the present disclosure, constituent elements included in the disclosure have been expressed in the singular number or plural number in accordance with the embodiments. But, for description convenience, the expression of the singular number or plural number is merely selected suitable to a particular situation, and the present disclosure is not limited to singular or plural constituent elements. The constituent element expressed in the plural number may be constructed in the singular number, or the constituent element expressed in the singular number may be constructed in the plural number.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method of an electronic device in a wireless communication system, the method comprising:
   receiving, from another electronic device that performed a call attempt through a second network by transmitting an instant message (IM), a first message through a first network, wherein the first message includes instant message disposition notification (IMDN) request information and information associated with the IM that identifies the electronic device as an intended recipient, and wherein the information associated with the IM includes information indicating that the call attempt has failed;
generating a second message including information related to reception of the first message, wherein the second message includes an IMDN message including the information related to the reception of the first message; and
transmitting the second message through the first network.

2. The method of claim 1, wherein the first network includes a short message service (SMS) network, and
wherein the second network includes a packet data communication network.

3. The method of claim 1, wherein the information associated with the IM further includes IM transmission information, and
wherein the second message further includes information about whether the electronic device receives the first message.

4. The method of claim 1, wherein the information associated with the IM further includes information included in the IM,
wherein the second message further includes information about whether the electronic device receives the first message, and
wherein the information included in the IM includes at least one of image, character, video, and sound information.

5. The method of claim 1, wherein the information associated with the IM further includes a thumbnail of information included in the IM, and
wherein the second message further includes information about whether the electronic device receives the first message.

6. The method of claim 1, wherein the second message further includes information about whether the electronic device received the first message.

7. The method of claim 1, wherein the second message further includes information about checking the received first message.

8. The method of claim 1, wherein the second message further includes response writing information about the received first message.

9. The method of claim 1, wherein the second message further includes information about execution of at least one information among image, video, and sound information included in the received first message.

10. A message communication method of an electronic device, the method comprising:
notifying a server that packet data communication is unavailable;
connecting to a circuit data communication network;
receiving, from another electronic device that performed a call attempt through a second network by transmitting an instant message (IM), a transformed short message service (SMS) message, wherein the transformed SMS message corresponds to the IM that is transformed into an SMS message form, identifies the electronic device as an intended recipient, and includes instant message disposition notification (IMDN) request information and information indicating that the call attempt has failed; and
sending a response message to the received transformed SMS message, to the server, through the circuit data communication network, wherein the response message includes an IMDN message including the information related to the reception of the first message.

11. An electronic device, comprising:
a transceiver; and
at least one processor,
wherein the at least one processor is configured to:
control the transceiver to receive, from another electronic device that performed a call attempt through a second network by transmitting an instant message (IM), a first message through a first network, wherein the first message includes instant message disposition notification (IMDN) request information and information associated with the IM that identifies the electronic device as an intended recipient, and wherein the information associated with the IM includes information indicating that the call attempt has failed;
generate a second message including information related to reception of the first message, wherein the second message includes an IMDN message including the information related to the reception of the first message; and
control the transceiver to transmit the second message through the first network.

12. The electronic device of claim 11, wherein the first network includes a short message service (SMS) network, and
wherein the second network includes a packet data communication network.

13. The electronic device of claim 11, wherein the information associated with the IM further includes IM transmission information, and
wherein the second message further includes information about whether the electronic device receives the first message.

14. The electronic device of claim 11, wherein the information associated with the IM further includes information included in the IM,
wherein the second message further includes information about whether the electronic device receives the first message, and
wherein the information included in the IM includes at least one of image, character, video, and sound information.

15. The electronic device of claim 11, wherein the information associated with the IM further includes a thumbnail of information included in the IM,
wherein the second message further includes information about whether the electronic device receives the first message, and
wherein the information included in the IM includes at least one of image, character, video, and sound information.

16. The electronic device of claim 11, wherein the second message further includes information about whether the electronic device receives the first message.

17. The electronic device of claim 11, wherein the second message further includes information about checking the received first message.

18. The electronic device of claim 11, wherein the second message further includes response writing information about the received first message.

19. The electronic device of claim 11, wherein the second message further includes information about execution of at least one information among image, video, and sound information included in the received first message.

\* \* \* \* \*